(12) United States Patent
Takahashi

(10) Patent No.: US 10,324,257 B2
(45) Date of Patent: Jun. 18, 2019

(54) SEMICONDUCTOR OPTICAL WAVEGUIDE, METHOD FOR MANUFACTURING THE SAME, AND OPTICAL COMMUNICATION DEVICE USING THE SAME

(71) Applicant: NEC Corporation, Tokyo (JP)

(72) Inventor: Morio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/905,151

(22) Filed: Feb. 26, 2018

(65) Prior Publication Data

US 2018/0188449 A1 Jul. 5, 2018

Related U.S. Application Data

(63) Continuation of application No. 15/103,708, filed as application No. PCT/JP2014/006204 on Dec. 12, 2014, now Pat. No. 9,939,581.

(30) Foreign Application Priority Data

Dec. 18, 2013 (JP) ................................. 2013-261096

(51) Int. Cl.
*G02B 6/12* (2006.01)
*G02B 6/122* (2006.01)
*G02B 6/136* (2006.01)

(52) U.S. Cl.
CPC ............. *G02B 6/122* (2013.01); *G02B 6/136* (2013.01); *G02B 2006/12097* (2013.01)

(58) Field of Classification Search
CPC .................... G02B 6/122; G02B 6/136; G02B 2006/12097

(Continued)

(56) References Cited

U.S. PATENT DOCUMENTS 5,783,844 A 7/1998 Kobayashi et al.
5,940,555 A 8/1999 Inaba et al.
(Continued)

FOREIGN PATENT DOCUMENTS

CN 101034187 A 9/2007
EP 0704913 A2 4/1996
(Continued)

OTHER PUBLICATIONS

International Search Report corresponding to PCT/JP2014/006204 dated Feb. 24, 2015 (2 pages).
(Continued)

*Primary Examiner* — Jerry M Blevins
(74) *Attorney, Agent, or Firm* — Wilmer Cutler Pickering Hale and Dorr LLP

(57) ABSTRACT

It is difficult to actualize a semiconductor optical waveguide having desired properties that reflect design even when process technology for a semiconductor electronic circuit is applied as is to the production of a semiconductor optical waveguide.
The present invention includes: a substrate; a semiconductor optical waveguide structure arranged on the substrate; a planar region formed around the semiconductor optical waveguide structure on the substrate; and a semiconductor dummy structure that is arranged around the planar region on the substrate and is formed of a plurality of dummy patterns, wherein the semiconductor optical waveguide structure includes a line-symmetric pattern on a plane that is parallel to the substrate; and the plurality of dummy patterns are arranged symmetrically with respect to the symmetry axis of the line-symmetric pattern.

13 Claims, 6 Drawing Sheets

(58) Field of Classification Search
USPC .......................................................... 385/131
See application file for complete search history.

(56) References Cited

U.S. PATENT DOCUMENTS

| | | | |
|---|---|---|---|
| 2008/0175549 A1* | 7/2008 | Uetake | B82Y 20/00 |
| | | | 385/131 |
| 2008/0279497 A1 | 11/2008 | Liu et al. | |
| 2009/0052834 A1 | 2/2009 | Tanaka et al. | |
| 2014/0116983 A1 | 5/2014 | Kitamura et al. | |

FOREIGN PATENT DOCUMENTS

| | | |
|---|---|---|
| EP | 2028735 A1 | 2/2009 |
| JP | H05-323136 A | 12/1993 |
| JP | H07-56032 A | 3/1995 |
| JP | H08-181389 A | 7/1996 |
| JP | H10-227933 A | 8/1998 |
| JP | 2000-091319 A | 3/2000 |
| JP | 2001-51144 A | 2/2001 |
| JP | 2002-228862 A | 8/2002 |
| JP | 2002-289971 A | 10/2002 |
| JP | 2003-156642 A | 5/2003 |
| JP | 2005-142182 A | 6/2005 |
| JP | 2005-338467 A | 12/2005 |
| JP | 2006-011443 A | 1/2006 |
| JP | 2006-30734 A | 2/2006 |
| JP | 2006-126518 A | 5/2006 |
| JP | 2006-323135 A | 11/2006 |
| JP | 2007-233294 A | 9/2007 |
| JP | 2008-046546 A | 2/2008 |
| JP | 2009-053366 A | 3/2009 |
| JP | 2009-071067 A | 4/2009 |
| JP | 2014-089403 A | 5/2014 |
| JP | 2014-219509 A | 11/2014 |

OTHER PUBLICATIONS

Chinese Office Action issued by the State Intellectual Property Office of the People's Republic of China for Chinese Application No. 201480069140.2 dated Jun. 5, 2018 (14 pages).
Japanese Notification of Reasons for Refusal issued in Japanese Patent Application No. 2018-029261 dated Jan. 8, 2019, 9 pages.

* cited by examiner

SEMICONDUCTOR OPTICAL WAVEGUIDE, METHOD FOR MANUFACTURING THE SAME, AND OPTICAL COMMUNICATION DEVICE USING THE SAME

CROSS-REFERENCE TO RELATED APPLICATIONS

The present application is a continuation of application Ser. No. 15/103,708 filed Jun. 10, 2016, which is a national stage application of International Application No. PCT/JP2014/006204 entitled "Semiconductor Optical Waveguide, Method for Manufacturing the Same, and Optical Communication Device Using the Same," filed on Dec. 12, 2014, which claims priority to Japanese Application No. 2013-261096 filed on Dec. 18, 2013, the disclosures of which are hereby incorporated by reference in their entirety.

TECHNICAL FIELD

The present invention relates to a semiconductor optical waveguide, a method for manufacturing the semiconductor optical waveguide, and an optical communication device using the semiconductor optical waveguide. In particular, the present invention relates to a semiconductor optical waveguide in which a semiconductor thin film is used in an optical waveguide, a method for manufacturing the semiconductor optical waveguide, and an optical communication device using the semiconductor optical waveguide.

BACKGROUND ART

Larger-capacity and longer-distance optical fiber communication has progressed due to technologies such as high-speed intensity modulation signals and wavelength multiplexing. In addition to the technologies, in recent years, technologies such as polarized light multiplexing and multi-level phase modulation have been used due to the improvement of digital signal processing technology. In addition, communication capacities have been able to be still more increased utilizing existing optical fiber networks.

Such circumstances have caused demands for the higher integration, downsizing, higher functions, lower costs, and the like of optical communication devices used in optical fiber communication. There have been trade-off relationships between the demands, and it has been difficult to satisfy the demands in line with the conventional technologies.

The size, performance, and the like of an optical communication device depend greatly on the configuration and performance of an optical waveguide included in the optical communication device. Thus, production of optical waveguides has proceeded using manufacturing processes for semiconductor integrated circuits. Specifically, an optical waveguide is produced by designing fine optical waveguide patterns on a semiconductor thin film. Semiconductors, e.g., silicon and the like, have higher refractive indices than glass, and therefore, facilitate the downsizing of optical waveguides in comparison with glass waveguides. Further, the utilization and conversion of high-definition complementary metal oxide semiconductor (CMOS) process technology used in manufacturing of large scale integrations (LSIs) can be expected.

An example of such semiconductor (silicon) optical waveguides is described in each of PTLs 1 to 3, and the like. A silicon optical waveguide according to PTL 1 includes: a substrate including an insulator such as glass; a flat-shaped silicon thin film referred to as a base; and a rectangular waveguide including silicon and having a rectangular shape. The shape of the silicon optical waveguide is designed so that a predetermined relational expression between the width of the rectangular waveguide, a height upward from the substrate, and the thickness of the flat-shaped silicon thin film holds. As a result, the wavelength shift between TE and TM of guided light propagating through the silicon optical waveguide can be allowed to be less than 0.2 nm.

CITATION LIST

Patent Literature

[PTL 1] Japanese Patent Laid-Open No. 2006-11443
[PTL 2] Japanese Patent Laid-Open No. 2000-91319
[PTL 3] Japanese Patent Laid-Open No. 2003-156642

SUMMARY OF INVENTION

Technical Problem

However, the silicon optical waveguide according to PTL 1 has the following problem. First, points of concern in the production of the silicon optical waveguide will be described. In the silicon optical waveguide formed of silicon which is a material having a high refractive index, the field distribution in a propagation mode is very small in comparison with a glass waveguide formed of silica glass or the like, and therefore, the propagation mode changes sensitively with respect to the change of a core shape. As a result, high processing accuracy is required in comparison with the case of forming the optical waveguide by glass-forming technology. Specifically, with regard to the required pattern processing accuracy of the core width of an optical waveguide, the required processing accuracy of the glass waveguide is ±0.1 μm whereas the required processing accuracy of the silicon waveguide is ±several nanometers and is higher by two orders.

Furthermore, in the pattern processing of the optical waveguide, a region in which needed processing accuracy is required widely exists as well as being local. Specifically, a region in which needed processing accuracy is required, for example, such as a pattern in the vicinity of a gate, is local in a MOS transistor, whereas the region extends over the whole optical waveguide pattern in the optical waveguide. In other words, the high processing accuracy of a core width is required for an optical waveguide pattern that has a length of several tens of micrometers to several hundreds of micrometers, or that in some cases, is continuous in millimeter units.

In the case of requiring phase control over the whole optical waveguide pattern, polarization dependability or phase control with higher accuracy, and the like, the pattern processing accuracy of the core width of the optical waveguide is problematic. In other words, in the configuration of the silicon optical waveguide according to PTL 1, the phase of guided light propagating through the optical waveguide deviates from a designed value due to the occurrence of a deviation or fluctuation in optical waveguide core width in a manufacturing process.

There has been such a problem as described above that it is difficult to actualize a semiconductor optical waveguide having desired properties that reflect design even when process technology for a semiconductor electronic circuit is applied as is to the production of a semiconductor optical waveguide. In PTL 3, which proposes a designing method for determining a pattern for actualizing a photonic crystal waveguide, the occurrence of a deviation from a designed value in a manufacturing process is not supposed.

An object of the present invention is to provide: a semiconductor optical waveguide having desired properties that reflect design even when process technology for a semiconductor electronic circuit is applied as is to the production of a semiconductor optical waveguide; a method for manufacturing the semiconductor optical waveguide; and an optical communication device using the semiconductor optical waveguide.

Solution to Problem

A semiconductor optical waveguide of the present invention includes: a substrate; a semiconductor optical waveguide structure arranged on the substrate; a planar region formed around the semiconductor optical waveguide structure on the substrate; and a semiconductor dummy structure that is arranged around the planar region on the substrate and is formed of a plurality of dummy patterns, wherein the semiconductor optical waveguide structure includes a line-symmetric pattern on a plane that is parallel to the substrate; and the plurality of dummy patterns are arranged symmetrically with respect to a symmetry axis of the line-symmetric pattern.

An optical communication device of the present invention includes the semiconductor optical waveguide described above.

A method for manufacturing a semiconductor optical waveguide of the present invention includes: arranging a first clad layer and a core layer on a substrate; forming a core pattern by subjecting the core layer to photolithography and etching using a predetermined mask; and arranging a second clad layer on the formed core pattern, wherein the mask is formed by: periodically arranging a plurality of dummy patterns; removing a dummy pattern in a safety distance range with a predetermined central axis as a center; rearranging a dummy pattern in a control region that is adjacent to an outside of the safety distance range line-symmetrically with respect to the central axis; and forming an optical waveguide structure pattern in the safety distance range in such a way that the central axis and a central line of the optical waveguide structure pattern coincide with each other.

Advantageous Effects of Invention

In accordance with the present invention, there can be provided: a semiconductor optical waveguide having desired properties that reflect design even when process technology for a semiconductor electronic circuit is applied as is to the production of a semiconductor optical waveguide; a method for manufacturing the semiconductor optical waveguide; and an optical communication device using the semiconductor optical waveguide.

DESCRIPTION OF EMBODIMENTS

First Exemplary Embodiment

Figure 1A:
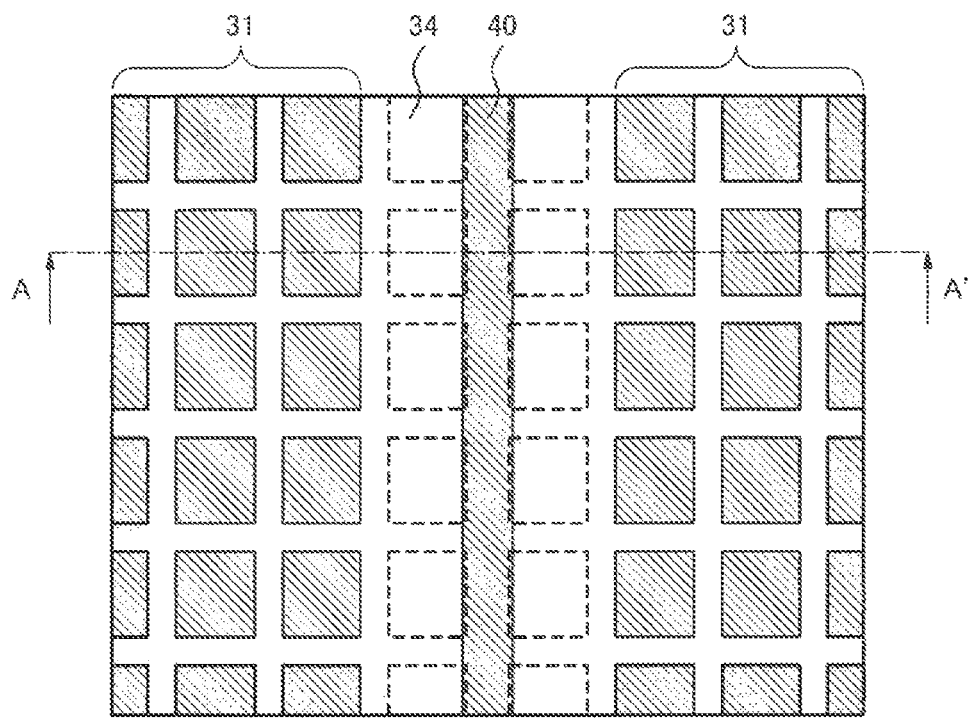
FIG. 1A is a plan view of a semiconductor optical waveguide according to a first exemplary embodiment of the present invention.
Figure 1B:
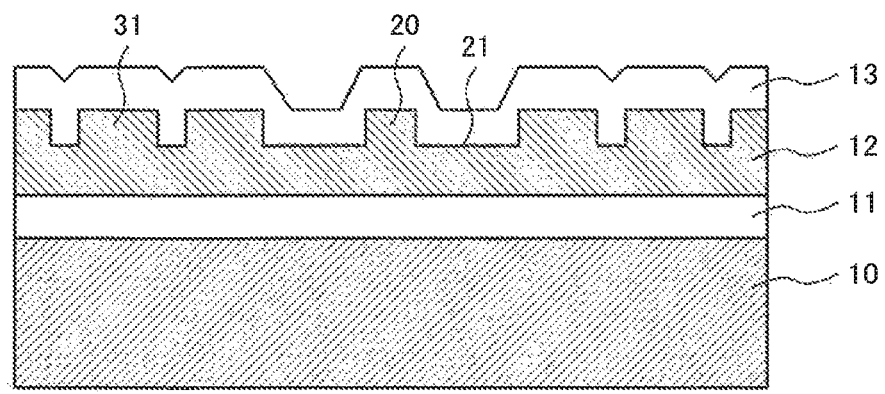
FIG. 1B is a cross-sectional view of the semiconductor optical waveguide according to the first exemplary embodiment of the present invention.

FIG. 1A is a plan view of a semiconductor optical waveguide according to a first exemplary embodiment of the present invention, and FIG. 1B is a cross-sectional view of the semiconductor optical waveguide. As an example of a semiconductor, the case of using silicon will be described. An upper silicon oxide layer 13 is layered on a silicon-on-insulator (SOI) substrate including a silicon substrate 10, a lower silicon oxide layer 11, and a silicon layer 12. A core 20 which is the core pattern of a silicon optical waveguide structure 40, and lattice-shaped dummy structures 31 are formed in the silicon layer 12.

The silicon optical waveguide structure 40 is a ridge optical waveguide of which the propagation layer is formed of a slab 21 having a small silicon film thickness and a flat shape, and the core 20 having a large silicon film thickness and a small width. In the cross-sectional view of FIG. 1B taken along the line A-A' of FIG. 1A, the projection shape of the ridge optical waveguide appears in the cross sections of portions of the core 20 and the slab 21.

The dummy structures 31 include a plurality of dummy patterns which have a thickness generally equal to the thickness of the core 20, and through which guided light does not propagate. The individual dummy patterns forming the dummy structures 31 are uniformly disposed in a wafer surface, and for example, are arranged at generally equal spacings in a lattice shape (continuous line portions of FIG. 1A). In other words, the dummy structures 31 include periodic structures. Among the individual dummy patterns forming the dummy structures 31, dummy patterns in predetermined ranges in regions in the vicinities of the core of the optical waveguide are removed in such a way as not to affect guided light propagating through the optical waveguide. The broken line portions of FIG. 1A are the removal traces 34 of the removed dummy patterns.

Subsequently, the action of the ridge silicon optical waveguide will be described. Guided light is confined in the core 20, and propagates through the core 20. In the ridge optical waveguide, the confinement of guided light in the cross section of the optical waveguide in a vertical direction is achieved by the silicon oxide layers 11 and 13 which are clad layers. Further, the confinement of light in the cross section of the optical waveguide in a horizontal direction is achieved by the projection shape formed of the core 20 and the slab 21. As described above, the propagation mode of guided light depends on the projection shape of the ridge optical waveguide.

In the design of an optical waveguide, the optical waveguide is commonly designed as a single mode waveguide with one propagation mode. For example, when the ridge optical waveguide has a projection shape having a height of 1.5 µm, a ridge width of 1.2 µm, and a slab thickness of 0.5 µm, the ridge optical waveguide functions as an optical waveguide for single-mode propagation. Guided light can be sufficiently confined in an optical waveguide in such a single-mode condition, and a large portion of the field distribution of the guided light is in the vicinity of the ridge of a core. It is sufficient to estimate the spread of the field distribution in the cross section of an optical waveguide core to be around 6 µm in full width. A range in which the field distribution spreads (hereinafter referred to as "safety distance range") is an index for determining whether or not to be the predetermined range in which the dummy patterns are removed.

Among the individual dummy patterns forming the dummy structures 31, dummy patterns located in the safety distance range are removed to be inhibited from affecting guided light propagating through the optical waveguide. In contrast, dummy patterns are arranged at positions apart from the safety distance range. In this exemplary embodiment, the pattern densities and etching areas of the dummy patterns are respectively designed to be constant values as much as possible.

The shapes of the individual dummy patterns forming the dummy structures 31 are designed, for example, to be rectangular shapes. For example, the lattice-shaped dummy structures 31 are formed by periodically arranging the plurality of dummy patterns. The shapes of the individual dummy patterns forming the dummy structures 31 are not limited to rectangular shapes but may be optional shapes such as circular and polygonal shapes.

It should be noted that the dummy structures including the plurality of dummy patterns are arranged line-symmetrically with respect to the central line of the optical waveguide core (hereinafter referred to as "core central line"). The reason for this is that local etching conditions in the vicinity of the waveguide core can be uniformalized by arranging the dummy structures symmetrically with respect to the optical waveguide core. For example, it is desirable to maintain the symmetry of the arrangement of the dummy structures with respect to the optical waveguide core in, at least, a region of 10 µm to 100 µm from the core central line. In contrast, it is not necessary that a region in where the need for controlling the phase of guided light with high accuracy is low has the symmetry of the arrangement of the dummy structures with respect to the optical waveguide core. In the region, the individual dummy patterns forming the dummy structures may be arranged in such a way as to have a uniform overall pattern density.

As described above, the plurality of dummy patterns forming the dummy structures are arranged in the region excluding the region in which the projection shape of the core of the ridge optical waveguide is formed, and the safety distance range, in the case of designing an optical waveguide pattern. In this case, the plurality of dummy patterns are arranged line-symmetrically with respect to the core central line. For example, the dummy patterns having the shape of a square with a side of 10 µm are arranged at an equal pitch of 15 µm. The shapes of the individual dummy patterns forming the dummy structures may be determined depending on a manufacturing process used, for example, such as a dry etching apparatus using plasma and etching gas.

Next, a method for manufacturing the semiconductor optical waveguide described above will be described. A photomask used in a photolithography step for etching processing of a semiconductor core layer is formed based on the design of waveguide patterns including the dummy patterns described above. First, photomask data in which a plurality of dummy patterns are periodically arranged on the whole surface is created. Then, in a region in which a waveguide core pattern is arranged, dummy patterns in a safety distance range with a core central line as a center are removed from the photomask data. Furthermore, in a waveguide pattern region in which the width of the waveguide is intended to be precisely controlled, for example, in a region that is at not less than a safety distance from the core central line and is 10 µm to 100 µm from the core central line, the plurality of already arranged dummy patterns are removed from the photomask data. Then, a plurality of dummy patterns are newly arranged in the region of the photomask data in such a way as to be line-symmetrical with respect to the core central line. Finally, the waveguide core pattern and the dummy patterns are synthesized on the same photomask data. An etching mask is formed on a substrate in the photolithography step using the photomask produced using the photomask data prepared as described above, and the etching processing and the like of the substrate are performed, thereby producing the optical waveguide.

Specifically, a first clad layer (for example, $SiO_2$ layer) and a core layer (for example, Si layer) are arranged on the substrate, a core pattern is formed on the core layer through the photolithography step using the photomask described above and the etching step, and a second clad layer (for example, $SiO_2$ layer) is arranged on the formed core pattern, thereby producing the optical waveguide according to this exemplary embodiment. When a plurality of optical waveguides were prototyped using the mask pattern formed as described above, it was confirmed that the deviations of their optical phases and the like from designed values were small, and their desired properties were able to be achieved.

The configuration of the semiconductor optical waveguide described above and the method for manufacturing the semiconductor optical waveguide enable the suppression of the occurrence of a deviation and fluctuation in the width of an optical waveguide core in an etching process which is one of processes for manufacturing the optical waveguide core, and the formation of the width of the optical waveguide with high accuracy. As a result, the semiconductor optical waveguide having desired properties can be uniformly actualized using a process for manufacturing a semiconductor electronic circuit.

Next, the results of the comparative investigation of this example and related technology will be described. Examples of the related technology include a method including disposing a throwaway pattern (dummy pattern) as well as an intrinsically necessary pattern in a wafer surface to be etched. An example in which such a throwaway pattern is disposed is described in PTL 2. In a dry etching method and a thin film pattern according to PTL 2, a pattern in which openings exist within 300 µm or less over the whole wafer surface is used when a silicon thin film formed on a glass substrate is dry-etched. In addition, it is described that the etching of the whole wafer surface can be uniformalized. When the related technology described above is applied as is to the production of a silicon optical waveguide, the following problem occurs.

Figure 6A:
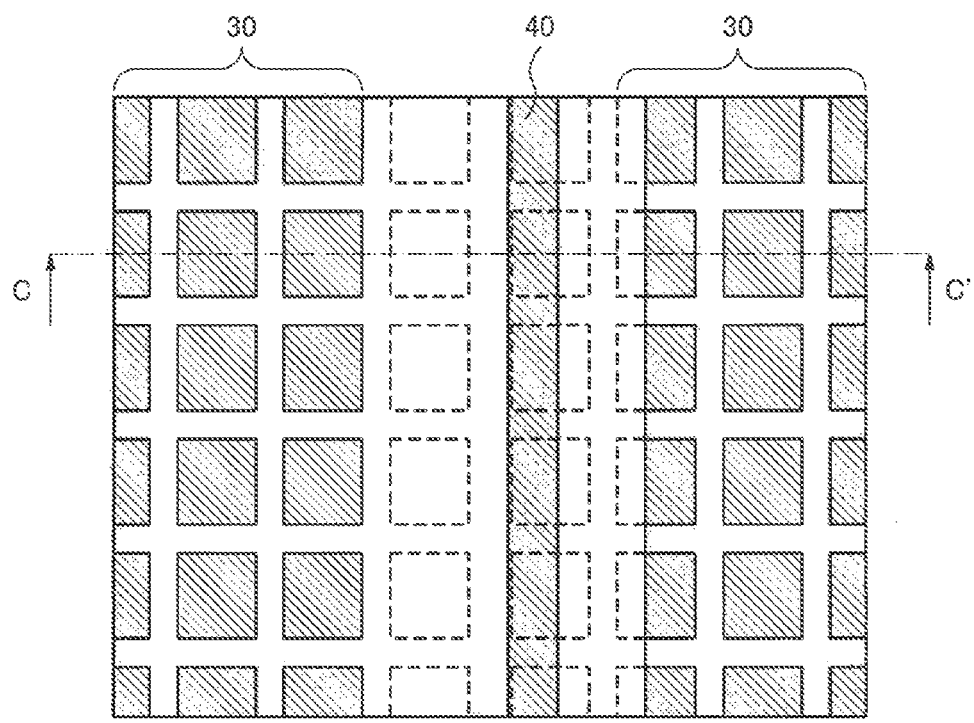
FIG. 6A is a plan view illustrating the configuration of a related semiconductor optical waveguide.
Figure 6B:
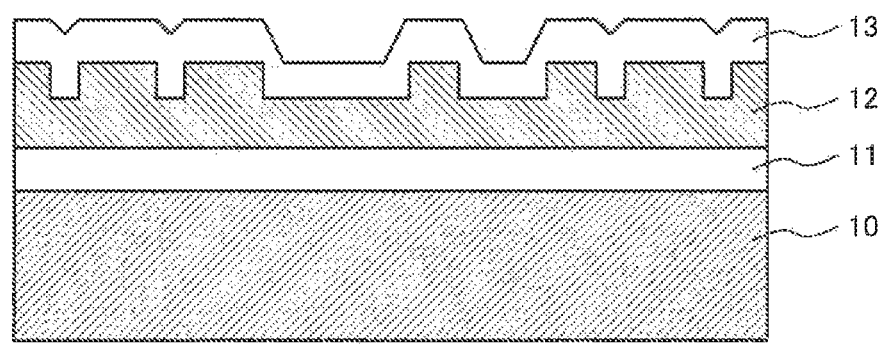
FIG. 6B is a cross-sectional view illustrating the configuration of the related semiconductor optical waveguide.

FIG. 6A is a plan view of a semiconductor optical waveguide to which the related dry etching method is applied, and FIG. 6B is a cross-sectional view of the semiconductor optical waveguide. In a dummy semiconductor formed using the related technology, individual patterns are periodically arranged over the whole wafer surface. In contrast, a core pattern forming a silicon optical waveguide structure 40 is arranged at a predetermined position in a wafer surface depending on the design of an optical circuit. In periodically arranged dummy structures 30, dummy patterns (broken line portions of FIG. 6A) arranged in a region overlapping the silicon optical waveguide core pattern and in a region in the vicinity of the silicon optical waveguide core pattern are removed in advance in the stage of designing the optical circuit. In this case, a pattern obtained after the removal becomes line-asymmetrical with respect to the core central line of the optical waveguide.

The dummy patterns become line-asymmetrical with respect to the core central line, thereby allowing local etching regions in the vicinity of the optical waveguide core to be asymmetrical. Because a pattern density in the wafer surface is kept at an approximately constant level due to the arrangement of the dummy patterns, the average etching rate of the whole wafer is kept at a constant level. However, in the vicinity of the waveguide core, a local etching state is changed to change the shapes of the waveguide patterns from designed values. A problem occurs that it is impossible to achieve desired properties in the optical waveguide in which a region requiring high processing accuracy is wide due to the deviation of the shapes of the waveguide patterns from the designed values.

Figure 7A:
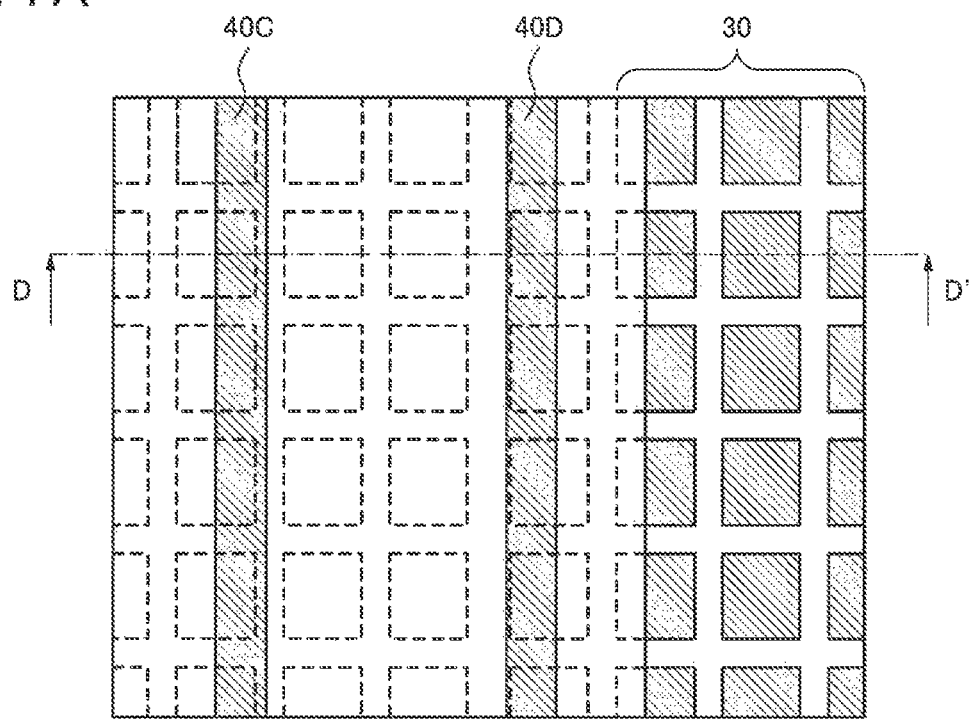
FIG. 7A is a plan view illustrating the configuration of another related semiconductor optical waveguide.
Figure 7B:
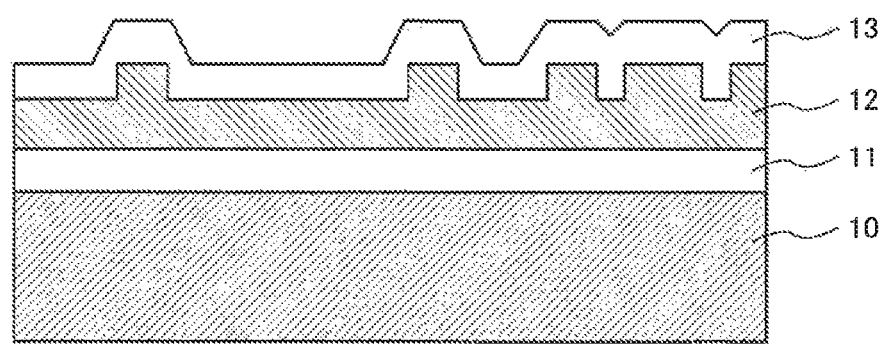
FIG. 7B is a cross-sectional view illustrating the configuration of the other related semiconductor optical waveguide.

FIG. 7A is a plan view of another silicon optical waveguide to which the related dry etching method is applied, and FIG. 7B is a cross-sectional view of the silicon optical waveguide. In FIG. 7A and FIG. 7B, two silicon optical waveguide patterns 40C and 40D in a silicon optical waveguide structure are arranged in the vicinity of each other. In a periodically arranged dummy structure 30, dummy patterns arranged in a region overlapping each optical waveguide pattern and in a region in the vicinity of each optical waveguide pattern are removed (broken line portions of FIG. 7A). In this case, any dummy pattern is not arranged in a region between the two silicon optical waveguide patterns 40C and 40D. In other words, the dummy patterns are arranged only on the right of the optical waveguide 40D. As a result, the dummy patterns are arranged line-asymmetrically with respect to the core central line of the optical waveguide.

When the dummy patterns arranged in the optical waveguide region and the region in the vicinity thereof are removed from the periodically arranged dummy patterns, and the remaining dummy patterns are arranged asymmetrically with respect to the optical waveguide patterns, etching regions in the right and left of the optical waveguide core becomes asymmetrical. In this case, a local etching state is changed in the vicinity of the waveguide core, and the shapes of the waveguide patterns deviate from designed values. As a result, a problem occurs that it is impossible to achieve desired properties in the optical waveguides in which it is necessary to control the optical phase of propagating light with high accuracy, and the like. In particular, this problem becomes remarkable when a plurality of optical waveguides are arranged in parallel.

As described above, it is impossible to actualize a silicon optical waveguide having desired properties that reflect design when dummy pattern arrangement used in a step for dry-etching a related semiconductor electronic circuit is applied as is to a process for manufacturing a silicon optical waveguide.

In contrast, in this exemplary embodiment, the symmetrical arrangement of the dummy patterns is maintained even in the region in the vicinity of the optical waveguide, as described above. In other words, the optical waveguide pattern included in the silicon optical waveguide structure has a line-symmetrical axis, and the dummy patterns are arranged line-symmetrically with respect to the optical waveguide pattern. Accordingly, using a process for manufacturing a semiconductor electronic circuit, desired properties can be achieved even for an optical waveguide in which a region requiring high processing accuracy is wide, and for an optical waveguide in which it is necessary to control the optical phase of propagating light with high accuracy. As described above, this exemplary embodiment has excellent effects in comparison with the related technology.

Second Exemplary Embodiment

Figure 2:
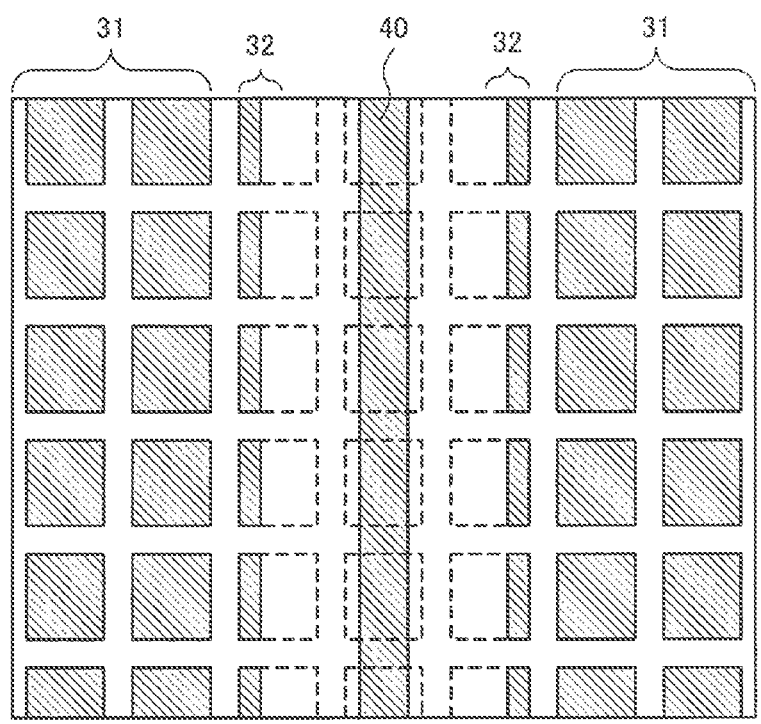
FIG. 2 is a plan view illustrating the configuration of a semiconductor optical waveguide according to a second exemplary embodiment of the present invention.

FIG. 2 is a plan view illustrating the configuration of a semiconductor optical waveguide according to a second exemplary embodiment of the present invention. The configuration of the plan view illustrated in FIG. 2 and the configuration of the plan view illustrated in FIG. 1A are different from each other in view of the shapes of dummy patterns arranged in a region with maintained symmetry. In other words, in FIG. 2, a plurality of dummy patterns arranged in a region in the vicinity of a silicon optical waveguide structure 40 have partially chipped shapes, thereby forming pseudo-lattice-shaped dummy structures 32. The other configuration is formed in the same manner as in the semiconductor optical waveguide of FIG. 1A.

In other words, the dummy patterns having the partially chipped shapes are arranged line-symmetrically with respect to the central line of the core pattern of the silicon optical waveguide structure 40, as illustrated in FIG. 2. In this exemplary embodiment, the uniformity of etching is also obtained by arranging the dummy patterns line-symmetrically in the region in the vicinity of an optical waveguide core.

As described above, the dummy patterns arranged in the region in the vicinity of the optical waveguide may have the partially chipped shapes of the patterns. Due to the shapes and arrangement of such dummy patterns, the formation of the optical waveguide with high accuracy is maintained in a process for etching an optical waveguide core. In other words, the semiconductor optical waveguide having desired properties can be formed using a process for manufacturing a semiconductor electronic circuit.

Third Exemplary Embodiment

Figure 3:
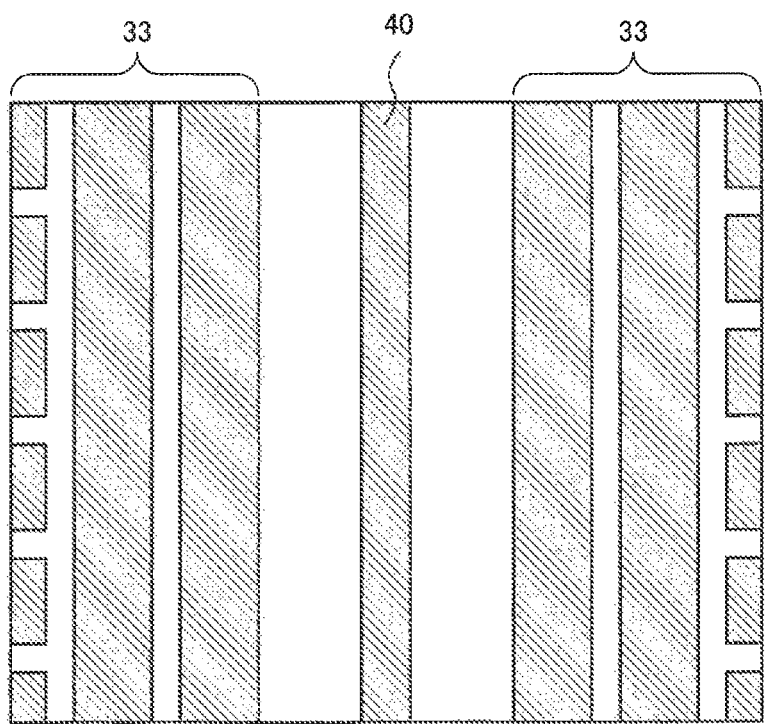
FIG. 3 is a plan view illustrating the configuration of a semiconductor optical waveguide according to a third exemplary embodiment of the present invention.

FIG. 3 is a plan view illustrating the configuration of a semiconductor optical waveguide according to a third exemplary embodiment of the present invention. The configuration of the plan view illustrated in FIG. 3 and the configuration of the plan view illustrated in FIG. 1A are different from each other in view of the shapes of dummy patterns arranged in a region in the vicinity of a silicon optical waveguide structure 40. In other words, in FIG. 3, dummy patterns forming dummy structures continue in the elongation direction of the core central line of the semiconductor optical waveguide, and are not separated. The long dummy structures 33 are arranged line-symmetrically with respect to the central line of the core pattern of the silicon optical waveguide structure 40. The other configuration is the same as the configuration illustrated in FIG. 1A.

For example, many bending patterns of an optical waveguide are generated in the design of the downsizing and integration of the optical waveguide. When lattice-shaped dummy patterns are arranged in the vicinities of the right and left of the arc-shaped optical waveguide patterns, a problem such as remaining of small patterns may occur in a manufacturing process. It is not necessary to arrange square-shaped dummy patterns in a lattice shape. In a region having a complicated shape in which the dummy patterns and waveguide patterns overlap each other, the dummy patterns can be arranged in such a way that the dummy patterns are formed to be long similarly in the case of the waveguide patterns, and the density of the dummy patterns is constant.

As described above, dummy patterns at distances near to the core center of a waveguide pattern more strongly affect the etching state of an optical waveguide. Thus, for example, long dummy patterns can also be arranged within distances of up to around 60 μm from a waveguide core center, and lattice-shaped dummy patterns can also be arranged in a region at not less than a distance of 60 μm. It is not necessary to arrange lattice-shaped dummy patterns in an outer region line-symmetrically with respect to a core central line.

By arranging long dummy patterns, line symmetry with respect to the core center of the dummy patterns can be secured even in a bending waveguide designed in a complicated shape such as, for example, a trigonometric function or a clothoid curve, and the control of the optical phase of guided light can be stabilized.

As described above, the dummy patterns arranged in the region in the vicinity of the optical waveguide can be formed by continuously arranging the individual patterns in the direction of the core central line. By arranging such long dummy patterns, design with high accuracy can be maintained in an etching process. In other words, the semiconductor optical waveguide having desired properties can be actualized using a process for manufacturing a semiconductor electronic circuit.

Fourth Exemplary Embodiment

Figure 4:
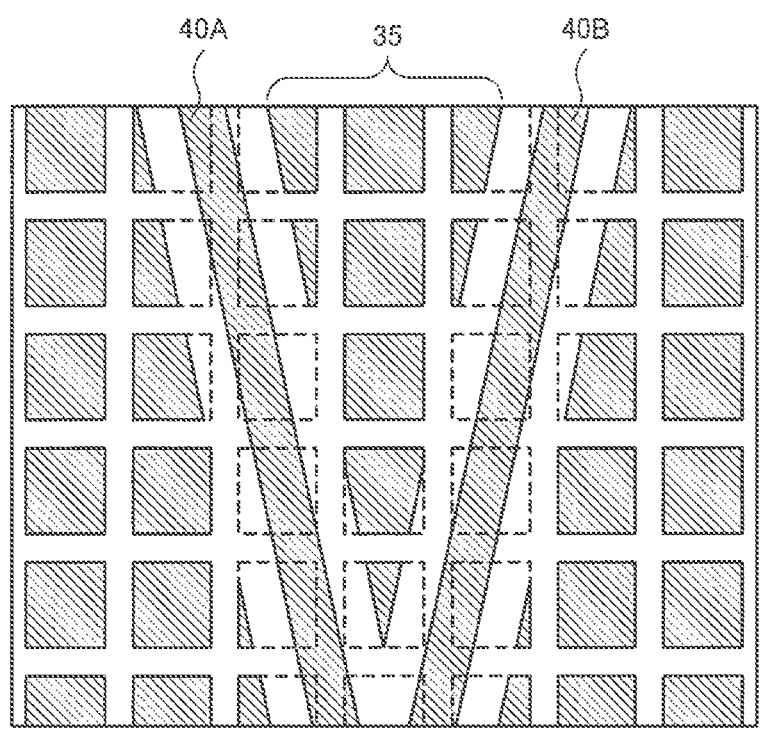
FIG. 4 is a plan view illustrating the configuration of a semiconductor optical waveguide according to a fourth exemplary embodiment of the present invention.

FIG. 4 is a plan view illustrating the configuration of a semiconductor optical waveguide according to a fourth exemplary embodiment of the present invention. The configuration of the plan view illustrated in FIG. 4 and the configuration of the plan view illustrated in FIG. 1A are different from each other in view of the number of optical waveguides, and a form for arranging the optical waveguides. In other words, the distance between two silicon optical waveguide patterns 40A and 40B adjacent to each other varies in silicon optical waveguide structures of FIG. 4. In FIG. 4, square-shaped dummy patterns are arranged in a region between the two optical waveguide patterns 40A and 40B adjacent to each other. The other configuration is the same as the configuration illustrated in FIG. 1A.

When a plurality of optical waveguide patterns are arranged in parallel, the design of optical phases with high accuracy, causing no optical phase difference between the optical waveguides, may be demanded. However, when the distance between two optical waveguides is short, it is impossible to arrange the dummy patterns line-symmetrically with respect to a core center in the individual optical waveguides. Thus, the plurality of optical waveguide patterns are regarded as one group, and the dummy patterns are arranged to be line-symmetrical with respect to the central line of the group (hereinafter referred to as "pattern central line"). Although such an arrangement allows the core shapes of the individual optical waveguides to be changed in comparison with the case of achieving symmetry with respect to a core central line as in FIG. 1A, the core shapes are similarly changed in two optical waveguides symmetrically with respect to the pattern central line, and the changes of the optical phases are the same. In other words, the amounts of change in the optical phases between the plurality of optical waveguides become equal due to symmetry, and no difference between the optical phases occurs. Accordingly, performance can be prevented from deteriorating in an optical circuit using a relative phase difference such as an asymmetrical Mach-Zehnder interferometer.

As described above, a plurality of dummy patterns forming a dummy structure 35 in a region between the silicon optical waveguide structures are also arranged line-symmetrically with respect to a central line (pattern center) in the case of grouping the two optical waveguides 40A and 40B. As a result, the symmetry of the arrangement of the dummy patterns with respect to an optical waveguide core is kept, and an in-plane distribution is maintained in etching.

As described above, symmetry with respect to the central line of the grouped optical waveguide patterns is maintained in a region in the vicinity of the region with the varying spacing between the two optical waveguide patterns adjacent to each other. As a result, design with high accuracy can be maintained in a process for etching an optical waveguide core. In addition, the semiconductor optical waveguide having desired properties can be actualized using a process for manufacturing a semiconductor electronic circuit.

Fifth Exemplary Embodiment

Figure 5A:
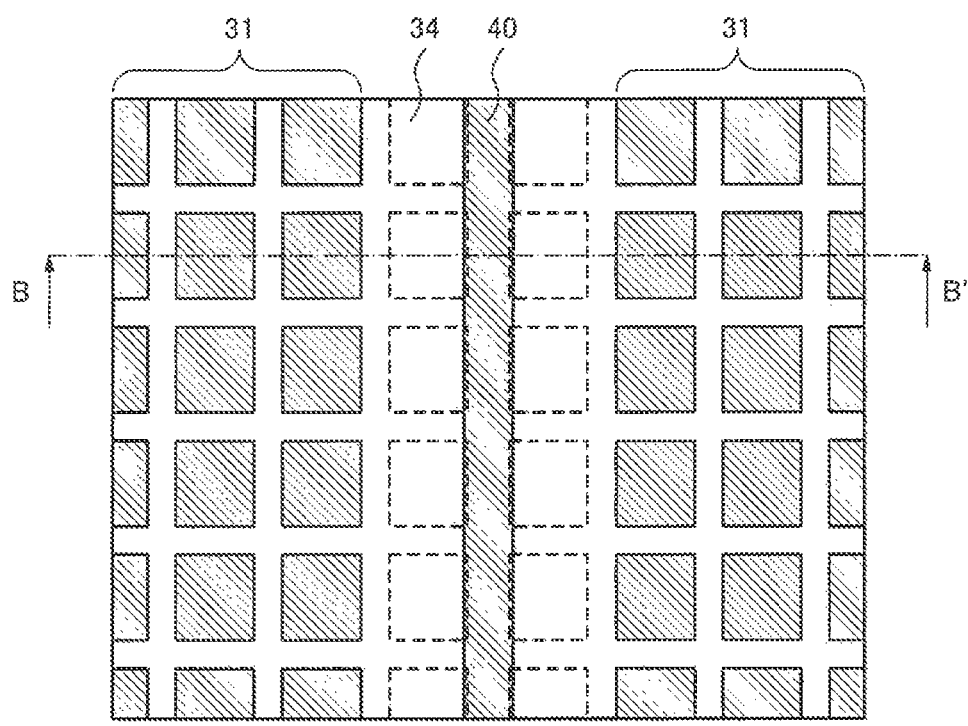
FIG. 5A is a plan view illustrating the configuration of a semiconductor optical waveguide according to a fifth exemplary embodiment of the present invention.
Figure 5B:
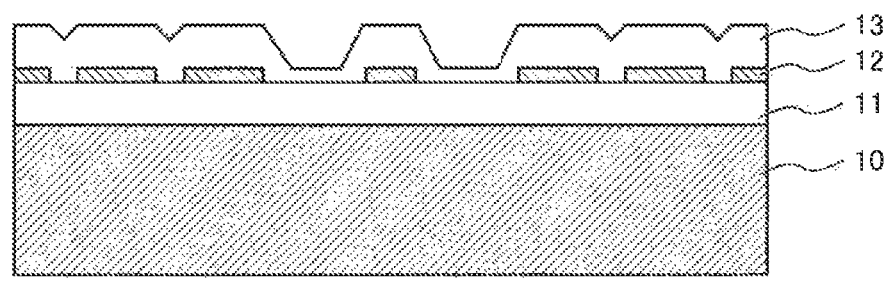
FIG. 5B is a cross-sectional view illustrating the configuration of the semiconductor optical waveguide according to the fifth exemplary embodiment of the present invention.

FIG. 5A is a plan view illustrating the configuration of a silicon optical waveguide according to a fifth exemplary embodiment of the present invention, and FIG. 5B is a cross-sectional view of the silicon optical waveguide. The configuration illustrated in FIG. 5A is different from the configuration illustrated in FIG. 1A in that the silicon optical waveguide is not a ridge type but a channel type. In other words, the cross-sectional shape of an optical waveguide core 20 is not the projection shape of a ridge optical waveguide but the rectangular shape of a channel optical waveguide in the cross-sectional view of FIG. 5B taken along the line B-B' of FIG. 5A. In other words, in FIG. 5B, there are regions in which a lower silicon oxide layer 11 and an upper silicon oxide layer 13 come in contact with each other. The other configuration is the same as the configuration of FIG. 1.

In FIG. 5A and FIG. 5B, a plurality of dummy patterns forming lattice-shaped dummy structures are also arranged line-symmetrically with respect to the core central line of a silicon optical waveguide structure 40. As described above, the effect of decreasing the influence of the position of the arrangement of the waveguide core and of decreasing the local in-plane distribution of etching is also exerted by maintaining the arrangement symmetry of the dummy patterns with respect to the optical waveguide core, in this example.

The arrangement pattern according to this exemplary embodiment is applicable not only to a linear optical waveguide pattern but also to a pattern in an asymmetrical Mach-Zehnder interferometer, an arrayed waveguide grating (AWG), an optical delay circuit, a grating, a ring resonator, an optical 90-degree hybrid mixer, or the like. The application to the design of an optical waveguide in which the phase state of guided light is important is possible, and can be expected to exhibit a similar effect.

The silicon optical waveguide may not be a ridge type but be a channel type. The cross-sectional shapes of the dummy patterns may not be projection shapes but be rectangular shapes. As described above, it is made possible to maintain design with high accuracy in an etching process by arranging the dummy patterns line-symmetrically with respect to the core central line or pattern central line of the optical waveguide pattern. As a result, the semiconductor optical waveguide having desired properties can be actualized using a process for manufacturing a semiconductor electronic circuit.

Some or all of the exemplary embodiments described above can be described as the following supplementary notes, but are not limited to the following.

(Supplementary Note 1)
A semiconductor optical waveguide, including:
a substrate;
a semiconductor optical waveguide structure arranged on the substrate; and
a semiconductor dummy structure arranged, apart from the semiconductor optical waveguide structure, on the substrate,
wherein the semiconductor optical waveguide structure includes a line-symmetric pattern on a plane that is parallel to the substrate; and
the semiconductor dummy structure includes a region in which a pattern shape on a plane that is parallel to the substrate is symmetric with respect to the symmetry axis of the line-symmetric pattern.

(Supplementary Note 2)
The semiconductor optical waveguide according to Supplementary Note 1,
wherein the pattern shape includes a periodic structure.

(Supplementary Note 3)
The semiconductor optical waveguide according to Supplementary Note 2,
wherein the pattern shape is in a state in which a part or the whole of each pattern forming the pattern shape is chipped in the vicinity of the semiconductor optical waveguide structure.

(Supplementary Note 4)
The semiconductor optical waveguide according to Supplementary Note 3, wherein the vicinity includes a region in which the field distribution of guided light propagating through the semiconductor optical waveguide structure exists.

(Supplementary Note 5)
The semiconductor optical waveguide according to any one of Supplementary Notes 1 to 4,
wherein each pattern shape forming the semiconductor dummy structure is a rectangular shape.

(Supplementary Note 6)
The semiconductor optical waveguide according to any one of Supplementary Notes 1 to 4,
wherein the pattern shape includes a region in which each pattern shape forming the pattern shape continues in a direction along the symmetry axis.

(Supplementary Note 7)
The semiconductor optical waveguide according to any one of Supplementary Notes 1 to 6,
wherein in a case in which the shape of the semiconductor optical waveguide structure is a single linear shape, the symmetry axis is the central line of the linear shape.

(Supplementary Note 8)
The semiconductor optical waveguide according to any one of Supplementary Notes 3 to 5,
wherein the semiconductor optical waveguide structure includes a plurality of optical waveguide structures; and
the pattern shape in the vicinity of a region between the plurality of optical waveguide structures includes at least one unit pattern forming the pattern shape.

(Supplementary Note 9)
An optical communication device, including the semiconductor optical waveguide according to any one of Supplementary Notes 1 to 8.

(Supplementary Note 10)
A method for manufacturing a semiconductor optical waveguide, including:
a step of forming a mask pattern used when a semiconductor layer is etching-processed; and
a step of forming a semiconductor optical waveguide structure by etching-processing a semiconductor layer using the mask pattern,
wherein the step of forming the mask pattern includes steps of:
arranging a dummy structure pattern with a periodic structure on the whole surface of a target region to be etching-processed;
forming an optical waveguide structure pattern with a line-symmetry axis on the target region;
allowing the dummy structure pattern to overlap with the optical waveguide structure pattern in such a way that the dummy structure pattern is symmetrical with respect to the line-symmetry axis; and
removing the dummy structure pattern in the vicinity of the optical waveguide structure pattern.

This application claims priority based on Japanese Patent Application No. 2013-261096, which was filed on Dec. 18, 2013, and of which the entire disclosure is incorporated herein.

INDUSTRIAL APPLICABILITY

The semiconductor optical waveguide according to the present invention can be applied to optical communication devices of which the higher integration, downsizing, higher functions, lower costs, and the like are demanded.

REFERENCE SIGNS LIST

10 Silicon substrate
11 Lower silicon oxide layer
12 Silicon layer
13 Upper silicon oxide layer
20 Core
21 Slab
30 Dummy structure
31 Dummy structure
32 Dummy structure having pseudo-lattice shape
33 Long dummy structure
34 Removal trace of lattice-shaped dummy structure
35 Dummy structure in region between silicon optical waveguide structures
40 Silicon optical waveguide structure
40A, 40B, 40C, 40D Silicon optical waveguide pattern

The invention claimed is:
1. An optical waveguide, comprising:
a substrate;
a clad layer arranged on the substrate;
a core layer formed inside of the clad layer; and a plurality of dummy patterns with rectangular shapes in a lattice shape, wherein
the plurality of dummy patterns are formed inside of the clad layer, and arranged in a region being a predetermined distance apart from a central line of the core layer, the core layer being formed on a plane parallel to the substrate.

2. The optical waveguide according to claim 1, wherein the region comprises outside of a field distribution of guided light propagating in the core layer.

3. The optical waveguide according to claim 1, wherein the plurality of dummy patterns comprises at least two dummy patterns arranged line-symmetrically with respect to the central line of the core layer.

4. The optical waveguide according to claim 1, wherein the core layer is formed by a plurality of core patterns, and the plurality of dummy patterns includes at least two dummy patterns arranged line-symmetrically with respect to a central line defined by the plurality of core patterns.

5. The optical waveguide according to claim 1, wherein the plurality of dummy patterns are arranged at a position where the core layer is arranged between the plurality of dummy patterns in an elongation direction of the core layer.

6. The optical waveguide according to claim 1, further comprising a second dummy pattern that includes a partial structure of the plurality of dummy patterns and is arranged between the central line of the core layer and the plurality of dummy patterns.

7. An optical communication device, comprising the optical waveguide according to claim 1.

8. A method for constructing an optical waveguide, comprising:
arranging a clad layer on a substrate;
forming a core layer inside of the clad layer; and
arranging a plurality of dummy patterns with rectangular shapes in a lattice shape inside of the clad layer and in a region being a predetermined distance apart from a central line of the core layer, the core layer being formed on a plane parallel to the substrate.

9. The method according to claim 8, wherein the region comprises outside of a field distribution of guided light propagating in the core layer.

10. The method according to claim 8, wherein the plurality of dummy patterns comprises at least two dummy patterns arranged line-symmetrically with respect to the central line of the core layer.

11. The method according to claim 8, wherein
the forming the core layer includes forming a plurality of core patterns; and
the arranging the plurality of dummy patterns includes arranging at least two dummy patterns line-symmetrically with respect to a central line defined by the plurality of core patterns.

12. The method according to claim 8, wherein the arranging the plurality of dummy patterns includes arranging the plurality of dummy patterns at a position where the core layer is arranged between the plurality of dummy patterns in an elongation direction of the core layer.

13. The method according to claim 8, further comprising:
forming a second dummy pattern that includes a partial structure of the plurality of dummy patterns; and
arranging the second dummy pattern between the central line of the core layer and the plurality of dummy patterns.

* * * * *